(12) United States Patent
Martin et al.

(10) Patent No.: US 7,257,659 B2
(45) Date of Patent: Aug. 14, 2007

(54) METHOD FOR SIGNALING PCI/PCI-X STANDARD HOT-PLUG CONTROLLER (SHPC) COMMAND STATUS

(75) Inventors: Peter N. Martin, Olympia, WA (US); Buck W. Gremel, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 10/750,338

(22) Filed: Dec. 31, 2003

(65) Prior Publication Data

US 2005/0149658 A1 Jul. 7, 2005

(51) Int. Cl.
*G06F 13/00* (2006.01)
*G06F 11/00* (2006.01)
*G01R 31/28* (2006.01)

(52) U.S. Cl. .............. 710/300; 710/300; 710/301; 710/302; 710/304; 713/182; 713/322; 714/704; 714/724; 714/44

(58) Field of Classification Search ............... None
See application file for complete search history.

(56) References Cited

U.S. PATENT DOCUMENTS

| | | | | |
|---|---|---|---|---|
| 4,423,949 A | * | 1/1984 | Cormier et al. ............ | 399/22 |
| 5,933,609 A | * | 8/1999 | Walker et al. ............. | 710/304 |
| 5,963,928 A | * | 10/1999 | Lee .......................... | 705/401 |
| 5,966,510 A | * | 10/1999 | Carbonneau et al. ....... | 714/44 |
| 6,101,559 A | * | 8/2000 | Schultz et al. ............. | 710/15 |
| 6,286,066 B1 | * | 9/2001 | Hayes et al. .............. | 710/302 |
| 6,463,537 B1 | * | 10/2002 | Tello ......................... | 713/182 |
| 6,487,623 B1 | * | 11/2002 | Emerson et al. ............ | 710/302 |
| 6,529,987 B1 | * | 3/2003 | Reid ......................... | 710/302 |
| 6,532,558 B1 | * | 3/2003 | Allen et al. ................ | 714/724 |
| 6,564,329 B1 | * | 5/2003 | Cheung et al. ............. | 713/322 |
| 6,711,703 B2 | * | 3/2004 | MacLaren et al. .......... | 714/704 |
| 6,772,018 B2 | * | 8/2004 | Juntunen et al. ........... | 700/24 |
| 6,832,281 B2 | * | 12/2004 | Jones et al. ................ | 710/301 |
| 7,039,534 B1 | * | 5/2006 | Ryno et al. ................ | 702/63 |
| 2004/0243725 A1 | * | 12/2004 | Yakovlev et al. ........... | 710/1 |

(Continued)

FOREIGN PATENT DOCUMENTS

| | | |
|---|---|---|
| EP | 0811931 A | 12/1997 |
| JP | 08087822 | 4/1996 |

OTHER PUBLICATIONS

"PCI Standard Hot-Plug Controller and Subsystem Specification", Revision 1.0, dated Jun. 20, 2001, pp. 1, 20-22.*

(Continued)

*Primary Examiner*—Paul R. Myers
*Assistant Examiner*—Brian Misiura
(74) *Attorney, Agent, or Firm*—Blakely, Sokoloff, Taylor & Zafman LLP (57) ABSTRACT

According to embodiments of the present invention, indicators on a PCI/PCI-X controlled by a Standard Hot-Plug Controller (SHPC) have non-fifty percent duty cycle blinking patterns that communicate to an operator a particular command being processed, whether the command was processed successfully, whether a "hard" or "soft" error occurred if the command was processed successfully, and whether power was applied to the slot if the command was not processed successfully.

30 Claims, 7 Drawing Sheets

U.S. PATENT DOCUMENTS

2005/0149658 A1* 7/2005 Martin et al. ............... 710/302
2006/0031599 A1* 2/2006 Bomhoff et al. ............. 710/15

OTHER PUBLICATIONS

"PCI Express to PCI/PCI-X Bridge Specification", Revision 1.0, dated Jul. 14, 2003, pp. 1, 21, 25-26, 87.*

Schnurer, George (Translation: Cianciolo, Sabine), "New Goodies for PCI," Aug. 17, 2000, pp. 1-2. Retrieved from: URL: http://web.archive.org/web/20000817221501/http://www.heise.de/ct/english/97/05/030/ (Retrieved on Mar. 1, 2006).

PCT International Search Report & Written Opinion, PCT/US2004/043665, May 11, 2006.

* cited by examiner

METHOD FOR SIGNALING PCI/PCI-X STANDARD HOT-PLUG CONTROLLER (SHPC) COMMAND STATUS

BACKGROUND

1. Field

Embodiments of the present invention relate to hot-plug technology and, in particular, to peripheral component interconnect (PCI/PCI-X) standard hot-plug controllers (SHPCs).

2. Discussion of Related Art

A peripheral component interconnect (PCI/PCI-X) bus is a bus in a computer system that interconnects a microprocessor and peripheral devices, such as keyboards, disk drives, video adapters, etc. A PCI/PCI-X bus has slots into which the adapter cards for the peripheral devices can be inserted or removed. Hot-plug technology allows a user to physically remove or insert one or more PCI adapter cards without having to remove power to the entire system or re-booting the system software. Only the individual PCI/PCI-X slots are affected and the other devices in the system are not disrupted.

Hot-plug controllers were being developed by various vendors that were compatible with the PCI Hot-Plug Specification, Revision 1.0, Oct. 6, 1997, PCI Special Interest Group, Portland, Oreg. It has been proposed that standardized hot-plug controllers be developed so that vendor-specific hot-plug controllers could be compatible across many platforms. The PCI Standard Hot-Plug Controller and Subsystem Specification, Revision 1.0, Jun. 20, 2001, PCI Special Interest Group, Portland, Oreg., (hereinafter "SHPC Specification") was developed to meet this challenge.

The SHPC Specification provides that each slot for an adapter card have indicators, such as light emitting diodes (LEDs). For instance the SHPC Specification provides that there be two LEDs per slot, a power indicator (PLED) and an attention indicator (ALED). According to the SHPC Specification, each indicator is in one of three states: on, off, or blinking.

When the PLED is off, it is indicating that main power to the associated slot is off and that an adapter card may be safely inserted or removed from the slot. When the PLED is on, it is indicating that main power to the slot is on and that an adapter card may not be safely inserted or removed from the slot. When the PLED blinks, it is indicating that the slot is powering up or powering down and an adapter card cannot be safely inserted or removed from the slot.

When the ALED is on, it is indicating that an operational problem exists at the slot or adapter card. When the ALED is off, it is indicating that the slot and adapter card are operating normally. When the ALED is blinking, it is indicating that the system software is identifying the slot for a human operator to find. The SHPC Specification requires that when the PLED or ALED blinks, it blinks at a fifty percent duty cycle (±5%), such as 250 nanoseconds (ns) on and 250 ns off, at a prescribed frequency.

This indicator scheme has limitations, however, in that it does not communicate very much information about what the Standard Hot-Plug Controller (SHPC) is doing. The indicator scheme only shows whether a slot is active (the adapter card in the slot is powered), inactive (the adapter card in the slot is not powered), or in the process of changing states between being active and inactive, or vice versa.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
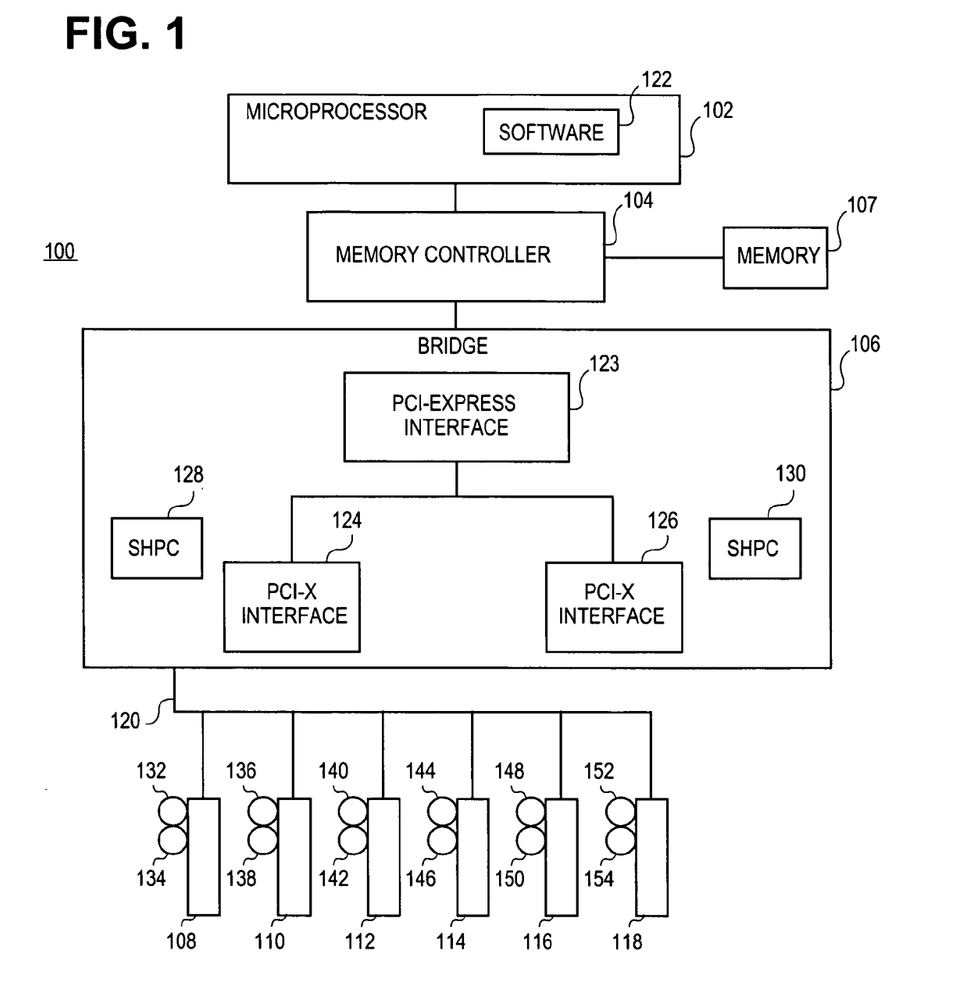
FIG. 1 is a high-level block diagram of a computer system according to an embodiment of the present invention.

FIG. 1 is a high-level block diagram of a computer system 100 according to an embodiment of the present invention. The system 100 typically supports a high-performance desktop, a workstation, a server, etc. In one embodiment the system 100 is a UNIX platform. In other embodiments, the system 100 may be Windows® or Windows® NT platform. Those skilled in the art will appreciate that a variety of platforms may be used when implementing embodiments of the present invention.

The system 100 in the illustrated embodiment includes a microprocessor 102 coupled to a memory controller 104. The memory controller 104 is coupled to a bridge 106 and to memory 107. The bridge 106 may be coupled to the memory controller 104. The bridge 106 also is coupled to one or more peripheral component interconnect (PCI/PCI-X) slots represented by the slots 108, 110, 112, 114, 116, and 118 via a PCI/PCI-X bus 120.

The microprocessor 102 may be any suitable microprocessor that performs conventional functions of executing programming instructions including implementing many embodiments of the present invention. The microprocessor 102 can be a processor of the Pentium® processor family available from Intel Corporation of Santa Clara, Calif., but might be any processor that is capable of loading commands into the SHPC 128 or 130. In one embodiment, the microprocessor 102 includes software 122 that the microprocessor utilizes to load commands into the SHPC 128 or 130.

Of course, other software drivers independent of the microprocessor may be used to drive commands to the bridge 106. After reading the description herein, a person having ordinary skill in the relevant art will readily recognize how to implement embodiments of the present invention using other software drivers.

The illustrated memory 107 may be any suitable memory that performs its conventional functions of storing data (pixels, frames, audio, video, etc.) and software (control logic, instructions, code, computer programs, etc.) for access by other system 100 components. In general, the memory 107 includes several data lines corresponding to several addressable storage locations. The memory 107 may be any known dynamic random access memory (DRAM), static RAM (SRAM), Flash memory, etc. Memory technology is well known.

The memory controller 104 may be any suitable memory controller that performs conventional functions of controlling and monitoring the status of memory 107 data lines, error checking, etc. The memory controller 104 also may be a primary interface to the microprocessor 102 and the bridge 110. Memory controller technology is well known.

The bridge 106 interfaces the processor/memory subsystem (i.e., the microprocessor 102, memory controller 104, and memory 107) to the PCI/PCI-X bus 120 hierarchy. The bridge 106 includes a PCI-Express interface 123 that in the illustrated embodiment is coupled to two PCI-X interfaces 124 and 126. Bridge technology is well known, PCI-Express technology is well known, and PCI-X technology is well known.

Although the bridge 106 is shown with the PCI-Express interface 123 coupled to the two PCI-X interfaces 124 and 126, embodiments of the present invention are not so limited. For example, the bridge 106 may be any host bridge, such as one capable of interfacing a processor/memory subsystem with a PCI/PCI-X bus. Alternatively, the bridge 106 may be any PCI/PCI-X-to-PCI/PCI-X bridge.

Each interface 124 and 126 is associated with a standard hot-plug controller (SHPC) 128 and 130, respectfully. Each SHPC 128 and 130 is associated with a PCI/PCI-X bus. In the illustrated embodiment, the SHPC 128 is associated with the PCI/PCI-X bus 120 and a PCI/PCI-X bus associated with the SHPC 130 is not shown. After reading the description herein, a person of ordinary skill in the relevant art will readily recognize how to implement the SHPC 130 for its associated PCI/PCI-X bus.

Each of the slots 108, 110, 112, 114, 116, and 118 is designed to accept an adapter card, which includes one or more PCI/PCI-X devices (e.g., printer, disk drive, keyboard, mouse, etc.) The SHPC 128 controls powering up and powering down of the slots 108, 110, 112, 114, 116, and 118 to allow adapter cards to be inserted or removed from the slots 108, 110, 112, 114, 116, and 118 without powering down the system 100 or re-booting the software 122.

Each SHPC is associated with slot control logic (not shown), which may be electronic component(s) that are responsible for providing signals to the SHPC 128. For example, the slot control logic may provide a signal to control the power state of one or more target PCI/PCI-X slots (e.g., PWREN). The slot control logic may provide a signal to control the connection of the PCI/PCI-X clock to one or more target PCI/PCI-X slots (e.g., CLKEN). The slot control logic may provide a signal to control the connection of various bus signals to one or more target PCI/PCI-X slots (e.g., BUSEN). The slot control logic may provide a signal to reset one or more target PCI/PCI-X slots (e.g., RST).

The SHPC Specification assumes that there are two light emitting diodes (LEDs) associated with and in close proximity to each slot 108, 110, 112, 114, 116, and 118. In the illustrated embodiment, the slot 108 includes an LED 132 and an LED 134, the slot 110 includes an LED 136 and an LED 138, the slot 112 includes an LED 140 and an LED 142, the slot 114 includes an LED 144 and an LED 146, the slot 116 includes an LED 148 and an LED 150, and the slot 118 includes an LED 152 and an LED 154.

According to the SHPC Specification, the LEDs can be on, off, or blinking at a fifty percent duty cycle and the SHPC Specification explicitly states that an SHPC can never change the state of an indicator in response to an event such as a power fault.

According to embodiments of the present invention, the LEDs have blinking patterns that have a duty cycle or a frequency that is not the prescribed duty cycle or frequency to communicate to an operator more information than whether the slot is active, inactive, or in the process of changing states between being active and inactive, or vice versa. For example, the LEDs may blink in a blinking pattern to communicate to an operator a particular command being processed, whether the command was processed successfully, whether power was applied to the slot if the command was not processed successfully, if the command was processed successfully, whether a fault occurred from which the bridge 106 is unlikely to recover and subsequent errant behavior is not only likely but is unpredictable (or a "hard error"), if the command was processed successfully, whether a fault occurred from which the bridge 106 is likely to be able to recover but the bridge 106 is being used in a manner that was not expected for normal operation (or a "soft error"), and/or whether power was applied to the target slots when the command was not processed successfully.

Figure 2:
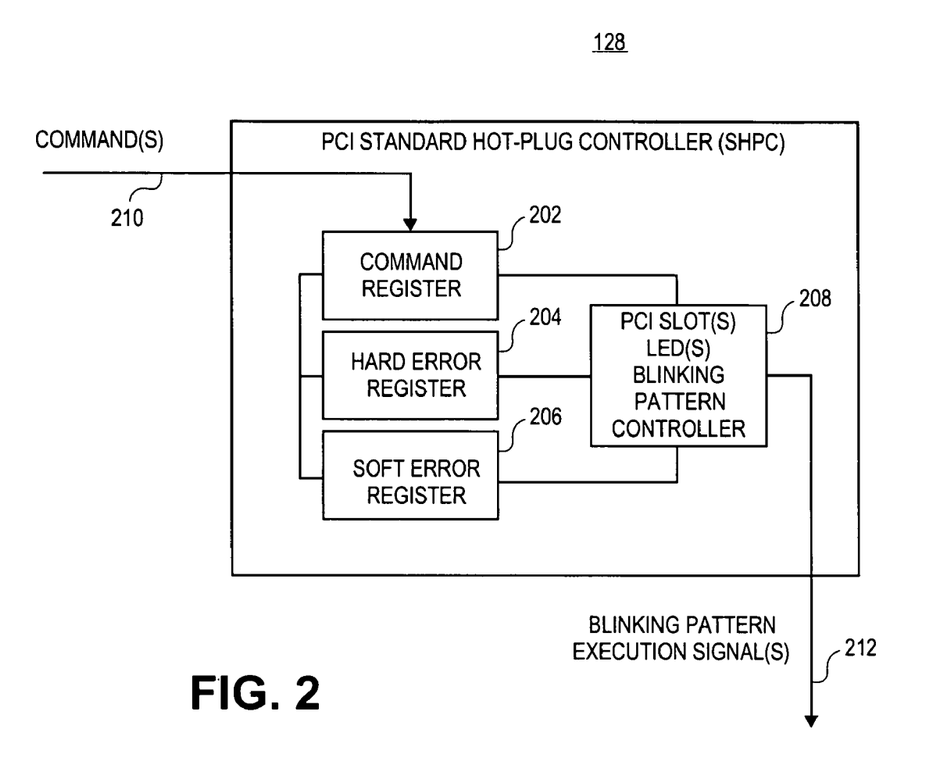
FIG. 2 is a high-level block diagram of the standard hot-plug controller depicted in FIG. 1 according to an embodiment of the present invention.

FIG. 2 is a high-level block diagram of the SHPC 128 according to an embodiment of the present invention. The SHPC 128 in the illustrated embodiment includes a command register 202. The command register 202 is coupled to a hard error register 204, a soft error register 206, and a PCI/PCI-X slot(s) LED(s) blinking pattern controller 208. The hard error register 204 and soft error register 206 also are coupled to the blinking pattern controller 208.

Figure 3:
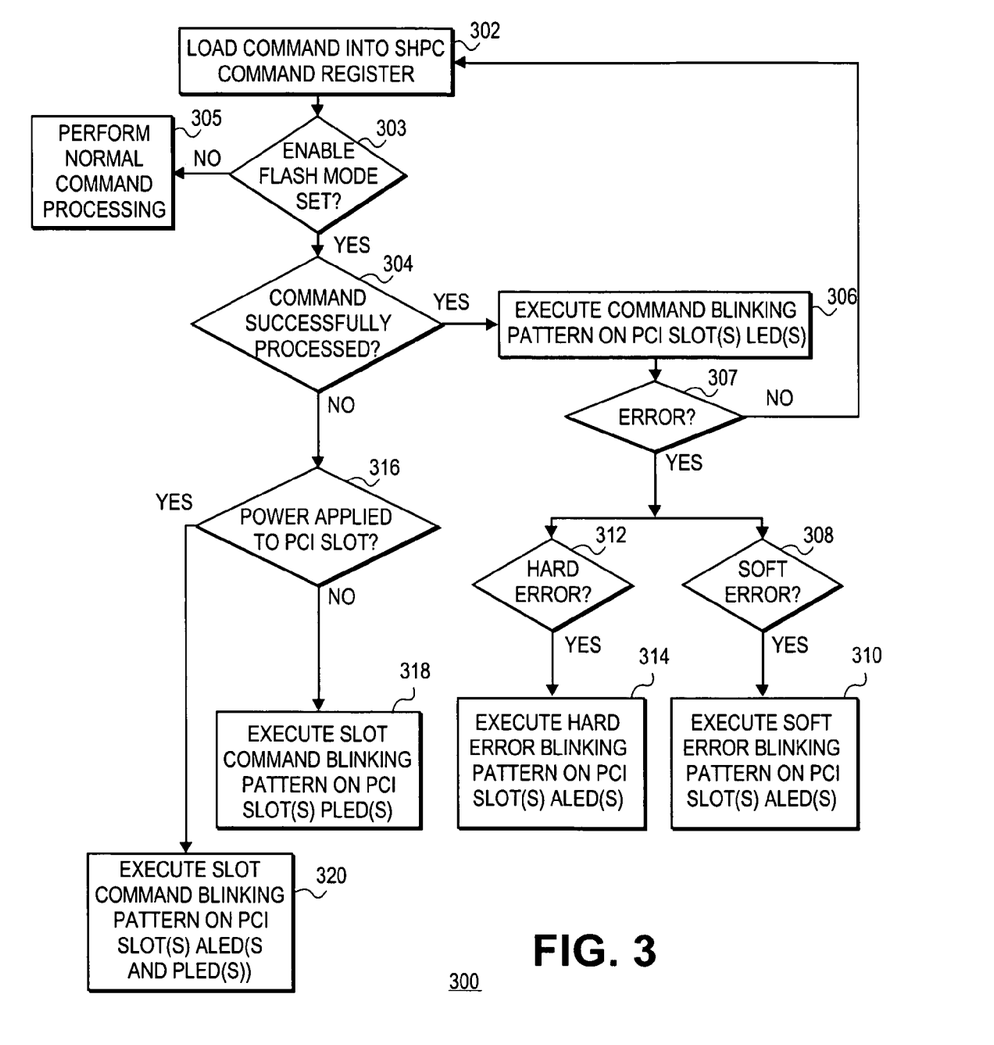
FIG. 3 is a flowchart illustrating a process for operating the standard hot-plug controller depicted in FIG. 1 according to an embodiment of the present invention.

FIG. 3 is a flowchart illustrating a process 300 for operating the SHPC 128 according to an embodiment of the present invention. The operations of the process 300 are described as multiple discrete blocks performed in turn in a manner that is most helpful in understanding embodiments of the invention. However, the order in which they are described should not be construed to imply that these operations are necessarily order dependent or that the operations be performed in the order in which the blocks are presented.

Of course, the process 300 is only an example process and other processes may be used to implement embodiments of the present invention. A machine-accessible medium with machine-readable instructions thereon may be used to cause a machine (e.g., a processor) to perform the process 300.

In a block 302, a command 210 is loaded into the command register 202. Although depicted as a single register, the command register 202 may include one or more registers that store a command 210 received from the software 122.

One command may be an "LED-ON" command, which instructs the SHPC 128 to turn an LED for one or more target slots "on" solid. Another command may be an "LED-OFF" command, which instructs the SHPC 128 to turn an LED for one or more target slot "off." Another command may be a "LED-BLINK" command, which instructs the SHPC 128 to blink the LED for one or more target slots.

Another command may be a "PWRONLY" command, which instructs the SHPC 128 to power up one or more target slots without connecting clock or bus signals to the slots. Another command may be an "ENABLE" command, which instructs the SHPC 128 to power up one or more target slots, and to connect the clock and bus signals. Another command may be a "DISABLE" command, which instructs the SHPC 128 to disconnect power, clock, and bus signals from one or more target slots. Another command may be a "CHANGE PCI/PCI-X BUS SPEED" command, which instructs the SHPC 128 to change the speed of the PCI/PCI-X bus 120.

In a block 303, the process 300 determines whether execution of blinking patterns to communicate to an operator more information than whether the slot is active, inactive, or in the process of changing states between being active and inactive, or vice versa, is enabled. In one embodiment of the present invention, a one-bit field (ENABLE_FLASH_MODE bit) in debug space of the blinking pattern controller 208 is provided to indicate that the LEDs can execute the blinking patterns described herein. In this embodiment, the software 122 may poll this bit to determine whether it is set.

If the ENABLE_FLASH_MODE bit is not set, then in a block 305, the process 300 performs normal command processing. If the ENABLE_FLASH_MODE bit is set, then the process 300 passes to a block 304.

In the block 304, the process 300 determines whether the command 210 was successfully processed. If the command 210 was successfully processed, the process 300 executes a block 306.

In the block 306, the LED(s) on one or more target slots blinks in a blinking pattern associated with the particular command. In embodiments of the present invention, the blinking pattern controller 208 may be a register that is capable of being programmed to cause blinking patterns to vary based on a particular command, error, SHPC status, etc.

Figure 4:
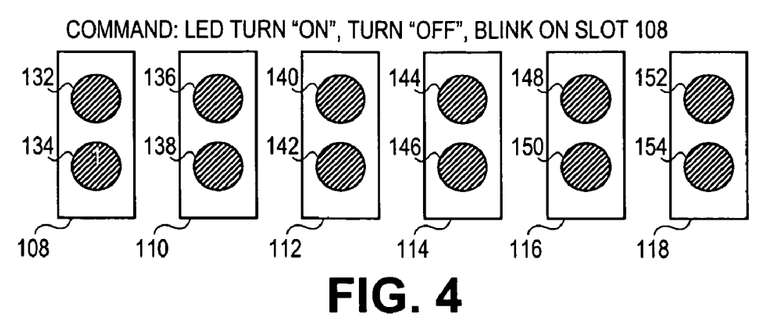
FIGS. 4 through 15 illustrate blinking patterns according to an embodiment of the present invention.

FIG. 4 illustrates a blinking pattern for the commands to turn an LED on, off, or make the LED blink, according to embodiments of the present invention. For purposes of explanation, assume that the top LEDs are the power indicators (PLEDs) and the bottom LEDs are the attention indicators (ALEDs).

In one example, if the command is to turn a slot 108 LED "ON," then the ALED 134 blinks once, as indicated by the numeral "1" on the ALED 134 in FIG. 4, to indicate that the command was successfully processed and the PLED 132 or the ALED 134 turns on solid as instructed by the command. The PLED 132 or the ALED 134 will continue to stay on until it is turned off. If the command is to turn a slot 108 LED "OFF," then the ALED 134 blinks once, as indicated by the numeral "1" on the ALED 134 in FIG. 4, to indicate that the command was successfully processed and the PLED 132 or the ALED 134 turns off as instructed by the command.

If the command is to make a slot 108 LED blink, then the ALED 134 blinks once, as indicated by the numeral "1" on the ALED 134 in FIG. 4 to indicate that the command was successfully processed and the PLED 132 or the ALED 134 blinks as instructed by the command. The PLED 132 or the ALED 134 will continue to blink for an undetermined amount of time until it is caused to stop.

Figure 5:
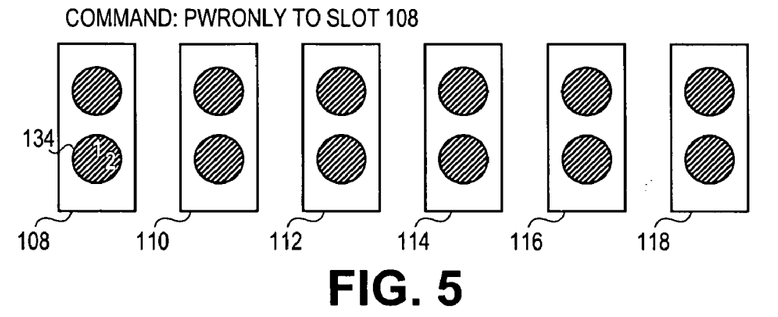

FIG. 5 illustrates a blinking pattern for a PWRONLY command for the slot 108. In the illustrated embodiment, the ALED 134 blinks twice, as indicated by the numerals "1" and "2" on the ALED 134 in FIG. 5, to indicate that the PWRONLY command was successfully processed.

Figure 6:
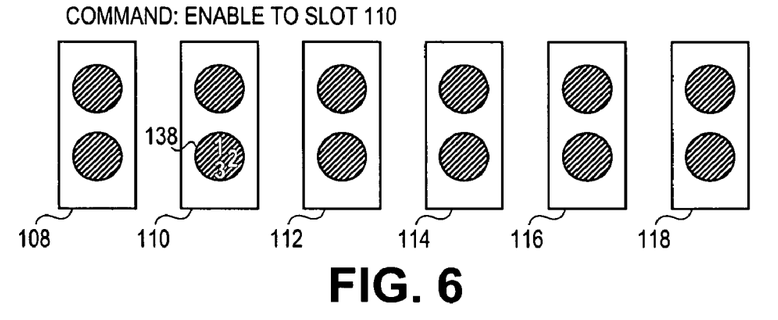

FIG. 6 illustrates a blinking pattern for an ENABLE command for the slot 110. In the illustrated embodiment, the ALED 138 blinks three times, as indicated by the numerals "1" and "2" and "3" on the ALED 138 in FIG. 6 to indicate that the ENABLE command was successfully processed.

Figure 7:
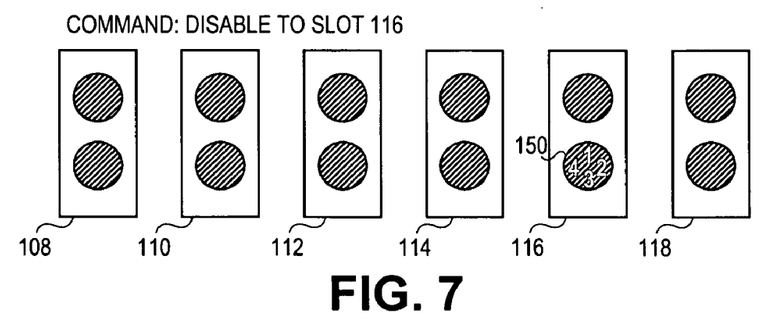

FIG. 7 illustrates a blinking pattern for a DISABLE command for the slot 116. In the illustrated embodiment, the ALED 150 blinks four times, as indicated by the numerals "1" and "2" and "3" and "4" on the ALED 150 in FIG. 7 to indicate that the DISABLE command was successfully processed.

Figure 8:
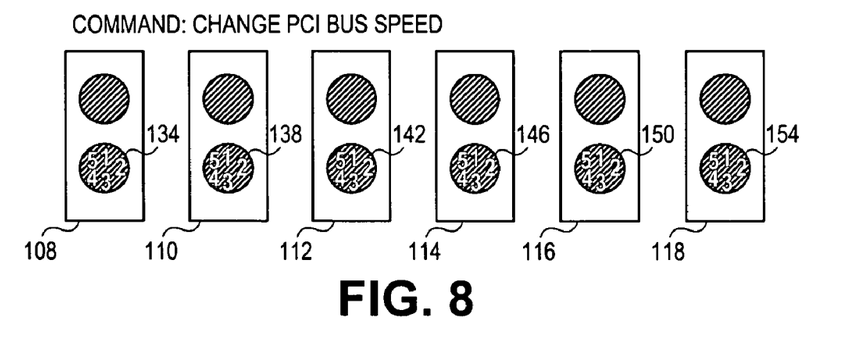

FIG. 8 illustrates a blinking pattern for a CHANGE PCI/PCI-X BUS SPEED command, which affects all slots 108, 110, 112, 114, 116, and 118. In the illustrated embodiment, each ALED 134, 138, 142, 146, 150, and 154 blinks five times, as indicated by the numerals "1" and "2" and "3" and "4" and "5" on the ALEDs 134, 138, 142, 146, 150, and 154 in FIG. 8 to indicate that the CHANGE PCI/PCI-X BUS SPEED command was successfully processed.

Figure 9:
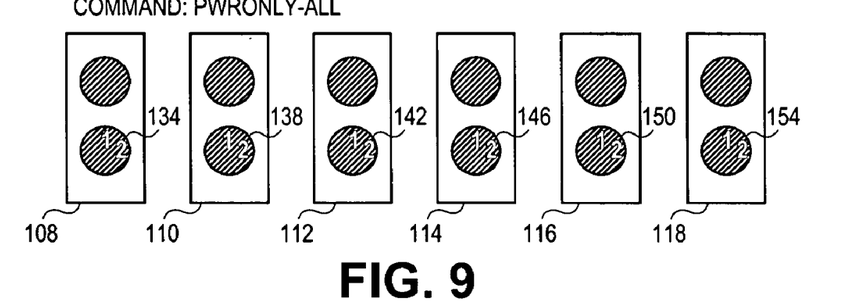

FIG. 9 illustrates a blinking pattern for a PWRONLY-ALL command, which affects all slots 108, 110, 112, 114, 116, and 118. In the illustrated embodiment, each ALED 134, 138, 142, 146, 150, and 154 blinks twice, as indicated by the numerals "1" and "2" on the ALEDs 134, 138, 142, 146, 150, and 154 in FIG. 9 to indicate that the PWRONLY-ALL command was successfully processed.

Figure 10:
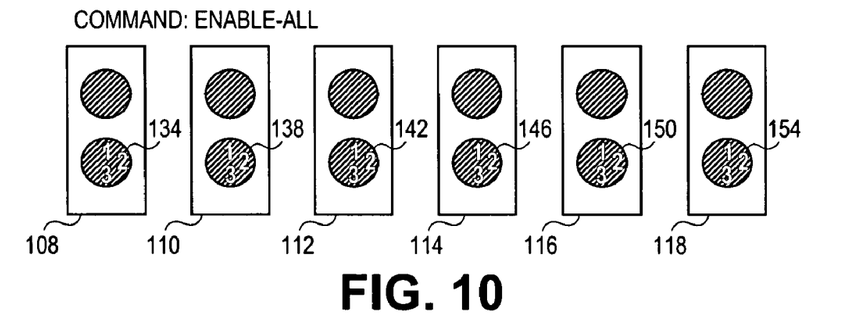

FIG. 10 illustrates a blinking pattern for an ENABLE-ALL command, which affects all slots 108, 110, 112, 114, 116, and 118. In the illustrated embodiment, each ALED 134, 138, 142, 146, 150, and 154 blinks three times, as indicated by the numerals "1" and "2" and "3" on the ALEDs 134, 138, 142, 146, 150, and 154 in FIG. 10 to indicate that the ENABLE-ALL command was successfully processed.

Returning back to FIG. 3, after the LED(s) on one or more target slots blinks in a blinking pattern associated with the particular command to indicate that the command has been processed successfully, a block 307 determines whether an error occurred. If an error has not occurred, then control returns to the block 302. If an error has occurred, a block 308 determines whether a soft error has occurred. The soft error register 206 may be a register that stores an indication that a soft error occurred. An example of a soft error may be an attempt to load the command register 202 while a command 210 is being processed. If a soft error has occurred, then a block 310 executes a "soft error" blinking pattern.

Figure 11:
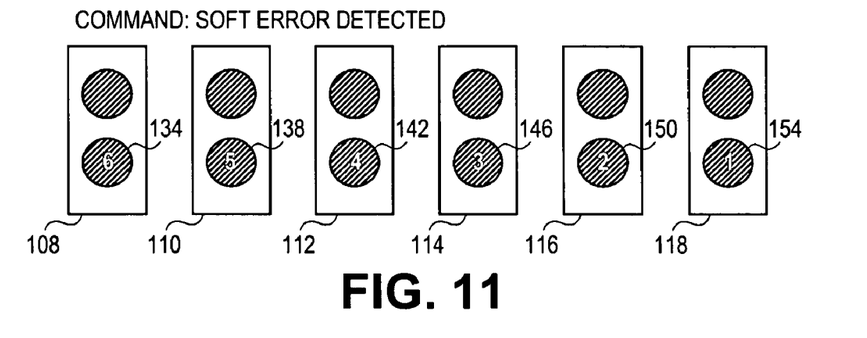

FIG. 11 illustrates a "soft error" blinking pattern according to an embodiment of the present invention. In the illustrated embodiment, the ALEDs 134, 138, 142, 146, 150, and 154 blink once in consecutive order, with the ALED 154 blinking first as indicated by the numeral "1" on the ALED 154, the ALDE 150 blinking second as indicated by the numeral "2" on the ALED 150, the ALED 146 blinking third as indicated by the numeral "3" on the ALED 146, the ALED 142 blinking fourth as indicated by the numeral "4" on the ALED 142, the ALED 138 blinking fifth as indicated by the numeral "5" on the ALED 138, and the ALED 134 blinking sixth as indicated by the numeral "6" on the ALED 134, with the first, the ALED 150 blinks once second.

If an error has occurred, after the LED(s) on one or more target slots blinks in a blinking pattern associated with the particular command to indicate that the command has been processed successfully, the a block 312 determines whether a hard error has occurred. The hard error register 204 may be a register that stores an indication that a hard error has occurred. An example of a hard error may be loading of a "Reserved" command into the command register 202. If a hard error has occurred, then a block 310 executes a "hard error" blinking pattern.

Figure 12:
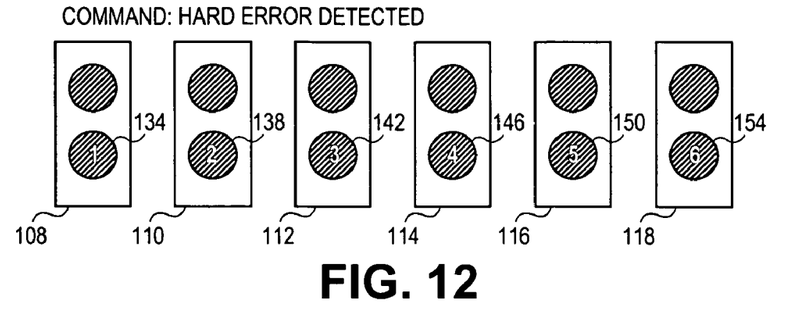

FIG. 12 illustrates a "hard error" blinking pattern according to an embodiment of the present invention. In the illustrated embodiment, the ALEDs 134, 138, 142, 146, 150, and 154 blink once in consecutive order, with the ALED 154 blinking sixth as indicated by the numeral "6" on the ALED 154, the ALED 150 blinking fifth as indicated by the numeral "5" on the ALED 150, the ALED 146 blinking fourth as indicated by the numeral "4" on the ALED 146, the ALED 142 blinking third as indicated by the numeral "3" on the ALED 142, the ALED 138 blinks second as indicated by the numeral "2" on the ALED 138, and the ALED 134 blinking first as indicated by the numeral "1" on the ALED 134.

Returning back to FIG. 3, if in the block 304 it is determined that the command was not successfully processed, the process 300 executes a block 316. In the block 316, the process 300 determines whether power is applied to the target slot(s). If power is not applied to the target slot(s), a block 318 executes a blinking pattern that indicates that the command was not successfully processed and that power is not applied to the target slot(s).

Figure 13:
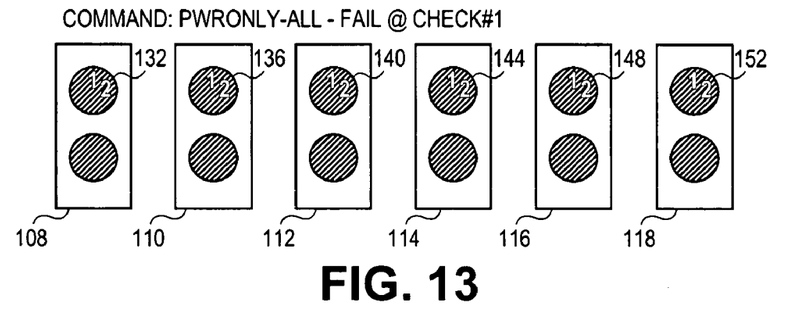

FIG. 13 illustrates a blinking pattern according to an embodiment of the present invention that is executed when the command 210 loaded into the command register 202 is "PVvRONLY-ALL," the command 210 was not successfully processed, and power was not applied to all slots 108, 110, 112, 114, 116, and 118. In the illustrated embodiment each PLED 132, 136, 140, 144, 148, and 152 blinks twice, as indicated by the numerals "1" and "2" on the PLEDs 132, 136, 140, 144, 148, and 152 in FIG. 13 to indicate that power has not been applied to the slots 108, 110, 112, 114, 116, and 118. To sum up, if the command 212 is PWRONLY-ALL, the command 212 is not successfully processed, and power is not applied to the slots 108, 110, 112, 114, 116, and 118, then each ALED 134, 138, 142, 146, 150, and 154 blinks twice (FIG. 9) and each PLED 132, 136, 140, 144, 148, and 152 blinks twice (FIG. 13).

Figure 14:
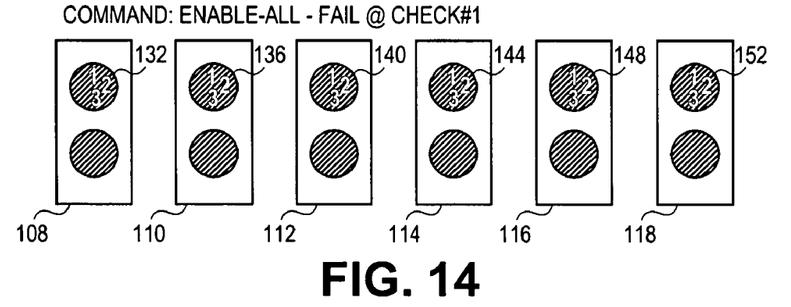

FIG. 14 illustrates a blinking pattern according to an embodiment of the present invention that is executed when the command 210 loaded into the command register 202 is "ENABLE-ALL" and the command 210 was not successfully processed because power was not applied to all slots 108, 110, 112, 114, 11.6, and 118. In the illustrated embodiment, each PLED 132, 136, 140, 144, 148, and 152 blinks three times, as indicated by the numerals "1" and "2" and "3" on the PLEDs 132, 136, 140, 144, 148, and 152 in FIG. 14 to indicate that the ENABLE command was not successfully processed and power has not been applied to the slots 108, 110, 112, 114, 116, and 118.

For example, each PLED 132, 136, 140, 144, 148, and 152 blinks three times, as indicated by the numerals "1" and "2" and "3" on the PLEDs 132, 136, 140, 144, 148, and 152 in FIG. 14 to indicate that the ENABLE command was not successfully processed and power has not been applied to the slots 108, 110, 112, 114, 116, and 118. To sum up, if the command 212 is ENABLE-ALL, the command 212 is not successfully processed, and power is not applied to the slots 108, 110, 112, 114, 116, and 118, then each PLED 132, 136, 140, 144, 148, and 152 blinks three times (FIG. 14).

Referring back to FIG. 3, if in the block 316, the process 300 determines that power is applied to the target slot(s), the process 300 executes a block 320. The block 320 executes a blinking pattern that indicates that power is applied to the target slot(s).

Figure 15:
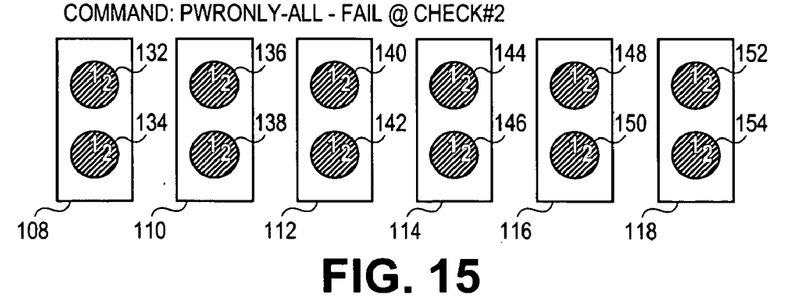

FIG. 15 illustrates a blinking pattern according to an embodiment of the present invention that is executed when the command 210 loaded into the command register 202 is "PWRONLY-ALL," the command 210 was not successfully processed, and power was applied to all slots 108, 110, 112, 114, 116, and 118. In the illustrated embodiment, each PLED 132, 136, 140, 144, 148, and 152 and each ALED 134, 138, 142, 146, 150, and 154 blinks twice, as indicated by the numerals "1" and "2" on the PLEDs 132, 136, 140, 144, 148, and 152 in FIG. 13 to indicate that the command 210 loaded into the command register 202 is "PWRONLY-ALL," the command 210 was not successfully processed, and power was applied to all slots 108, 110, 112, 114, 116, and 118.

Of course, other blinking patterns may be used to communicate to an operator a particular command being executed, whether the command was processed successful, whether an error occurred after the command was executed and/or whether the error is a "hard" error or a "soft" error, whether power is applied to the target slot(s), and/or whether power was applied to the target slots when the command was not processed successfully. After reading the description herein, a person of ordinary skill in the relevant art will readily recognize how to implement embodiments of the present invention using other blinking patterns.

Figure 16:
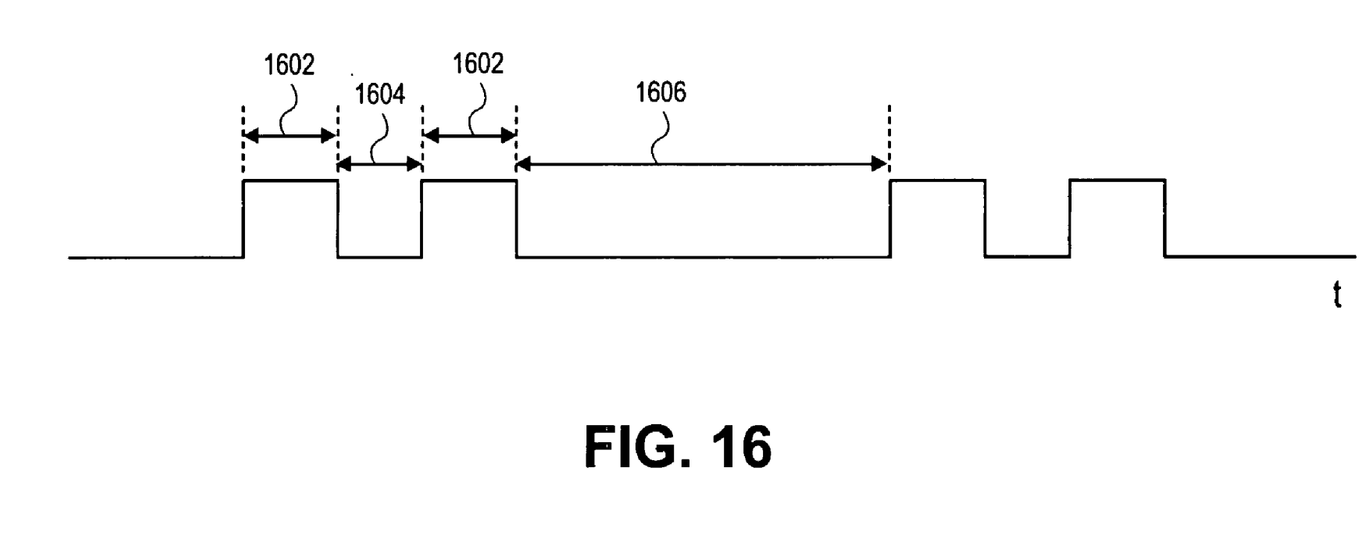
FIG. 16 is a timing diagram illustrating a non-fifty percent blinking pattern for light emitting diode(s) on a PCI/PCI-X slot(s) according to an embodiment of the present invention.

Recall that in embodiments of the present invention, the LEDs have blinking patterns that are less than or greater than a fifty percent duty cycle (±5%) to communicate to an operator information more than whether the slot is active, inactive, or in the process of changing states between being active and inactive, or vice versa. FIG. 16 is a timing diagram 1600 for a blinking pattern having a duty cycle that is less than or greater than a fifty percent (±5%).

In the illustrated embodiment, the cadence of the blinking pattern has an "on" period 1602 followed by an "off" period 1604 followed by another "off" period 1606 that marks the end of a command 210 blinking pattern and the start of a hard error blinking pattern and/or a soft error blinking pattern. Thus, if there is no hard error or soft error after the command 210 has been executed, then the "off" period 1606 may last until the next command 210 is executed. In one embodiment, the "on" period 1602 is one hundred twenty-eight milliseconds (128 ms), the "off" period 1604 is 128 ms, and the "off" period 1606 is 500 ms.

In embodiments of the present invention, the blinking pattern controller 208 may be a low priority requester of common resources in the system 100. Therefore, loading of a command 210 into the command register 202 during execution of a blinking pattern may cause the blinking pattern to be aborted and control may return to the SHPC 128. In these embodiments, the blinking pattern controller 208 may not flush the pending blinking pattern execution signal 212. Instead, the blinking pattern controller 208 may wait for the command 210 to be loaded before retrying the blinking pattern.

In one embodiment of the present invention, a one-bit field in debug space of the blinking pattern controller 208 is provided to indicate that a blinking pattern is being executed. In this embodiment, the software 122 may poll this bit to determine when to load the next command 210 to ensure that a pending blinking pattern is not squashed. The debug space also may be used to change the duty cycle of the blinking pattern.

Embodiments of the present invention may be implemented using hardware, software, or a combination thereof. In implementations using software, the software may be stored on a machine-accessible medium.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.), as well as electrical, optical, acoustic, or other form of propagated signals (e.g., carrier waves, infrared signals, digital signals, etc.).

In the above description, numerous specific details, such as particular processes, materials, devices, and so forth, are presented to provide a thorough understanding of embodiments of the invention. One skilled in the relevant art will recognize, however, that embodiments of the present invention can be practiced without one or more of the specific details, or with other methods, components, etc. In other instances, well-known structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. An apparatus, comprising:
    a standard hot-plug controller, the standard hot-plug controller having a blinking pattern controller to receive at least one command, the blinking pattern controller to:
        cause execution of a first blinking pattern on at least one indicator associated with at least one target peripheral component interconnect slot on a peripheral component interconnect bus, the first blinking pattern being unique to the command being processed, wherein a first unique blinking pattern is to indicate a first command to turn the indicator "on" solid; and
        cause execution of a second unique blinking pattern on the at least one indicator-associated with the at least one target peripheral component interconnect slot on the peripheral component interconnect bus, wherein the second unique blinking pattern is to indicate a second command different from the first command, wherein the first unique blinking pattern is different from the second unique blinking pattern.

2. The apparatus of claim 1, wherein a third unique blinking pattern is to indicate a third command to make the indicator blink in a blinking pattern having a duty cycle of approximately fifty percent, and wherein the peripheral component interconnect bus comprises a PCI-Express bus.

3. The apparatus of claim 1, wherein a second unique blinking pattern is to indicate a second command to apply power only to at least one target peripheral component interconnect slot, or wherein a third unique blinking pattern is to indicate a third command to enable at least one target peripheral component interconnect slot, or wherein a fourth unique blinking pattern is to indicate a fourth command to disable at least one target peripheral component interconnect slot, or wherein a fifth unique blinking pattern is to indicate a fifth command to change a speed of the peripheral component interconnect bus.

4. An apparatus, comprising:
    a standard hot-plug controller, the standard hot-plug controller having a blinking pattern controller to receive at least one command, the blinking pattern controller to:
        cause execution of a first unique blinking pattern and a second unique blinking pattern on at least one indicator associated with at least one target peripheral component interconnect slot on a peripheral component interconnect bus, and
        the first unique blinking pattern to indicate a hard error occurring during processing of the command and the second unique blinking pattern to indicate a soft error occurring during processing of the command.

5. The apparatus of claim 4, wherein the first unique blinking pattern is to indicate an error occurring before power is applied to the target slot.

6. The apparatus of claim 4, further comprising a third unique blinking pattern is to indicate an error occurring after power is applied to the target slot.

7. The apparatus of claim 4, wherein the unique blinking pattern has a duty cycle that is less than or greater than approximately fifty percent and wherein the peripheral component interconnect bus comprises a PCI-X bus.

8. A method, comprising:
    receiving a command at a standard hot-plug controller from a microprocessor; and
    causing execution of a blinking pattern on at least one indicator associated with at least one target peripheral component interconnect slot on a peripheral component interconnect bus,
    the blinking pattern indicating the command being processed,
    the blinking pattern having a duty cycle that is not fifty percent ±5%.

9. The method of claim 8, further comprising receiving a command to turn the indicator "on," "off," or make the indicator blink in a blinking pattern having a duty cycle of approximately fifty percent.

10. The method of claim 8, further comprising receiving a command to apply power to the target peripheral component interconnect slot, to enable the target peripheral component interconnect slot, to disable the target peripheral component interconnect slot, or to change the speed of the peripheral component interconnect bus.

11. A method, comprising:
    causing execution of a first unique blinking pattern and a second unique blinking pattern on at least one indicator associated with at least one target peripheral component interconnect slot on a peripheral component interconnect bus,
    the first unique blinking pattern indicating a hard error occurring during processing of the command and the second unique blinking pattern to indicate a soft error occurring during processing of the command.

12. The method of claim 11, wherein the first unique blinking pattern is indicating an error occurring before power is applied to the target slot.

13. The method of claim 11, wherein the first unique blinking pattern is indicating an error occurring after power is applied to the target slot.

14. The method of claim 11, further comprising causing execution of a third unique blinking pattern, the third unique blinking pattern having a duty cycle that is not fifty percent ±5%.

15. An article of manufacture including a machine-accessible tangible storage medium having data that, when accessed by a machine, cause the machine to perform the operations comprising:
    receiving a command at a standard hot-plug controller from a microprocessor; and
    causing execution of a blinking pattern on at least one indicator associated with at least one target peripheral component interconnect slot on a peripheral component interconnect bus, the blinking pattern indicating the command being processed, the blinking pattern having a duty cycle that is not fifty percent ±5%.

16. The article of manufacture of claim 15, wherein the machine-accessible tangible storage medium further includes data that cause the machine to perform operations comprising receiving a command to turn the indicator "on," "off," or make the indicator blink in a blinking pattern having a duty cycle of approximately fifty percent.

17. The article of manufacture of claim 15, wherein the machine-accessible tangible storage medium further includes data that cause the machine to perform operations comprising receiving a command to apply power to the target peripheral component interconnect slot, to enable the target peripheral component interconnect slot, to disable the target peripheral component interconnect slot, or to change the speed of the peripheral component interconnect bus.

18. An article of manufacture including a machine-accessible tangible storage medium having data that, when accessed by a machine, cause the machine to perform the operations comprising:

receiving at least one command at a standard hot-plug controller from a microprocessor; and causing execution of unique blinking patterns on at least one indicator associated with at least one target peripheral component interconnect slot on a peripheral component interconnect bus, and the unique blinking patterns indicating unique errors occurring during processing of the command, wherein the unique blinking patterns are to indicate a hard error and/or a soft error occurring during processing of the command.

19. The article of manufacture of claim 18, wherein the machine-accessible tangible storage medium further includes data that cause the machine to perform operations comprising indicating an error occurring before power is applied to the target slot.

20. The article of manufacture of claim 18, wherein the machine-accessible tangible storage medium further includes data that cause the machine to perform operations comprising causing execution of the blinking pattern at a duty cycle that is not fifty percent.

21. The article of manufacture of claim 18, wherein the machine-accessible tangible storage medium further includes data that cause the machine to perform operations comprising indicating an error occurring after power is applied to the target slot.

22. A system, comprising:

a peripheral component interconnect bus having at least one peripheral component interconnect slot thereon, the peripheral component interconnect slot having at least one indicator associated therewith, a bridge coupled to the peripheral component interconnect bus, the bridge having a standard hot-plug controller coupled to the peripheral component interconnect bus, the standard hot-plug controller to receive a command, and cause execution of a blinking pattern on at least one indicator, the blinking pattern to indicate the command being processed, the blinking pattern having a duty cycle that is not fifty percent ±5%.

23. The system of claim 22, further comprising a memory coupled to the bridge.

24. The system of claim 23, wherein the memory is a static random access memory (SRAM).

25. A system, comprising:

a peripheral component interconnect bus having at least one peripheral component interconnect slot thereon, the peripheral component interconnect slot having at least one indicator associated therewith, a bridge coupled to the peripheral component interconnect bus, the bridge having a standard hot-plug controller coupled to the peripheral component interconnect bus, the standard hot-plug controller to receive a command, and cause execution of a blinking pattern on at least one indicator, the blinking pattern to indicate an error occurring during processing of the command, the of blinking pattern having a duty cycle that is not fifty percent ±5%.

26. The system of claim 25, further comprising a memory coupled to the bridge.

27. The system of claim 26, wherein the memory is a static random access memory (SRAM).

28. A system, comprising:

a chipset including:

a standard hot-plug controller having a blinking pattern controller to receive at least one command, the blinking pattern controller to cause execution of a blinking pattern on at least one indicator associated with at least one target peripheral component interconnect slot on a peripheral component interconnect bus, the blinking pattern being unique to the command being processed, wherein a first unique blinking pattern is to indicate a first command to turn the indicator "on" solid, wherein a second unique blinking pattern is to indicate a second command different from the first command, wherein the first unique blinking pattern is different from the second unique blinking pattern; and static random access memory (SRAM) coupled to the standard hot-plug controller.

29. The system of claim 28, wherein the second unique blinking pattern is to indicate a second command to apply power to the target peripheral component slot.

30. The system of claim 28, wherein the second unique blinking pattern is to indicate a second command to disable the target peripheral component interconnect slot.

* * * * *